United States Patent
Kong (10) Patent No.: US 10,532,547 B2
(45) Date of Patent: Jan. 14, 2020

(54) CRASH PAD HAVING COATING AGENT IN FOAMING LAYER AND INTERRUPTING FILM BETWEEN FOAMING LAYER AND CRASH PAD SKIN

(71) Applicants: Hyundai Motor Company, Seoul (KR); Kia Motors Corporation, Seoul (KR)

(72) Inventor: Byung Seok Kong, Gunpo-si (KR)

(73) Assignee: Hyundai Motor Company, Seoul (KR)

(*) Notice: Subject to any disclaimer, the term of this patent is extended or adjusted under 35 U.S.C. 154(b) by 710 days.

(21) Appl. No.: 14/928,778

(22) Filed: Oct. 30, 2015

(65) Prior Publication Data

US 2016/0167350 A1 Jun. 16, 2016

(30) Foreign Application Priority Data

Dec. 12, 2014 (KR) .................. 10-2014-0179400

(51) Int. Cl.
| | | |
|---|---|---|
| *B32B 27/30* | (2006.01) | |
| *B32B 5/20* | (2006.01) | |
| *B32B 3/26* | (2006.01) | |
| *B32B 27/06* | (2006.01) | |
| *B32B 27/22* | (2006.01) | |

(52) U.S. Cl.
CPC ............ *B32B 27/304* (2013.01); *B32B 3/266* (2013.01); *B32B 5/20* (2013.01); *B32B 27/065* (2013.01); *B32B 27/22* (2013.01); *B32B 2307/56* (2013.01); *B32B 2605/00* (2013.01)

(58) Field of Classification Search
CPC .... B32B 2266/0278; B32B 2307/4026; B32B 2307/54; B32B 2307/558; B32B 2307/56; B32B 2605/00; B32B 2605/003; B32B 27/065; B32B 27/08; B32B 27/22; B32B 27/304; B32B 27/32; B32B 3/266; B32B 5/20
USPC ...... 280/728.1–729, 741–753; 428/131–140, 428/71; 296/187.08–187.13, 1.04; 297/216.1–216.2
See application file for complete search history.

(56) References Cited

U.S. PATENT DOCUMENTS

| | | | | |
|---|---|---|---|---|
| 4,952,447 A | * | 8/1990 | Phillips | ................... B32B 27/08 428/318.6 |
| 5,979,931 A | * | 11/1999 | Totani | ..................... B32B 27/08 280/728.3 |
| 6,168,187 B1 | * | 1/2001 | Yamada | ................ B60R 13/005 280/728.3 |
| 6,440,514 B1 | * | 8/2002 | Ueno | ........................ B32B 5/18 428/43 |

(Continued)

FOREIGN PATENT DOCUMENTS

| | | | | |
|---|---|---|---|---|
| FR | 3012815 A1 | * | 5/2015 | ............ C08J 9/0023 |
| JP | 05-200893 A | | 8/1993 | |

(Continued)

*Primary Examiner* — Frank J Vineis
*Assistant Examiner* — Alicia J Sawdon
(74) *Attorney, Agent, or Firm* — Morgan, Lewis & Bockius LLP (57) ABSTRACT

A crash pad comprises a skin including a plasticizer and a forming space. A foaming layer is foam-formed by injecting a foam liquid into the forming space and comprises a foam molecular formed by foam forming. A coating agent surrounds the foam molecular and prevents the transition of the plasticizer to the foaming layer.

13 Claims, 6 Drawing Sheets

(56) References Cited

U.S. PATENT DOCUMENTS

| | | | |
|---|---|---|---|
| 2004/0195814 A1* | 10/2004 | Muller | B60R 21/2165 |
| | | | 280/743.1 |
| 2008/0163977 A1* | 7/2008 | Keller | B32B 7/02 |
| | | | 156/285 |
| 2010/0068425 A1* | 3/2010 | Boinais | B32B 7/05 |
| | | | 428/32 |
| 2010/0129573 A1* | 5/2010 | Kim | A41D 31/005 |
| | | | 428/34.1 |
| 2016/0280878 A1* | 9/2016 | Amouroux | C08J 9/0023 |

FOREIGN PATENT DOCUMENTS

| | | |
|---|---|---|
| JP | 10-309787 A | 11/1998 |
| JP | 11-091056 A | 4/1999 |
| JP | 2001-342236 A | 12/2001 |
| JP | 2007-197471 A | 8/2007 |
| KR | 10-2004-0042678 A | 5/2004 |
| KR | 10-2011-0082952 A | 7/2011 |
| KR | 10-1145140 B1 | 5/2012 |

\* cited by examiner

FIG.1

-- Prior Art --

FIG.2

-- Prior Art --

FIG.3

-- Prior Art --

FIG.4

-- Prior Art --

CRASH PAD HAVING COATING AGENT IN FOAMING LAYER AND INTERRUPTING FILM BETWEEN FOAMING LAYER AND CRASH PAD SKIN

CROSS-REFERENCE TO RELATED APPLICATION

This application claims under 35 U.S.C. § 119(a) the benefit of priority to Korean Patent Application No. 10-2014-0179400 filed on Dec. 12, 2014, the entire content of which is incorporated herein by reference.

TECHNICAL FIELD

The present disclosure relates to a crash pad. More particularly, the present disclosure relates to a crash pad having a coating agent and an interrupting film, which may prevent permeation of a plasticizer and combination of the plasticizer with a foam molecular to prevent phenomena of curing and contraction of a crash pad skin, exposure of an airbag development line, and degradation of cold shock resisting property.

BACKGROUND

A vehicle includes a crash pad in front of a driver's seat and a passenger's seat to secure a driver or passenger upon crash of the driver or passenger due to an accident and the like.

The crash pad is made of a foam material having elastic cushion performance and absorbs an impact of certain degree while maintaining the aesthetic effect of a vehicle interior.

Figure 1:
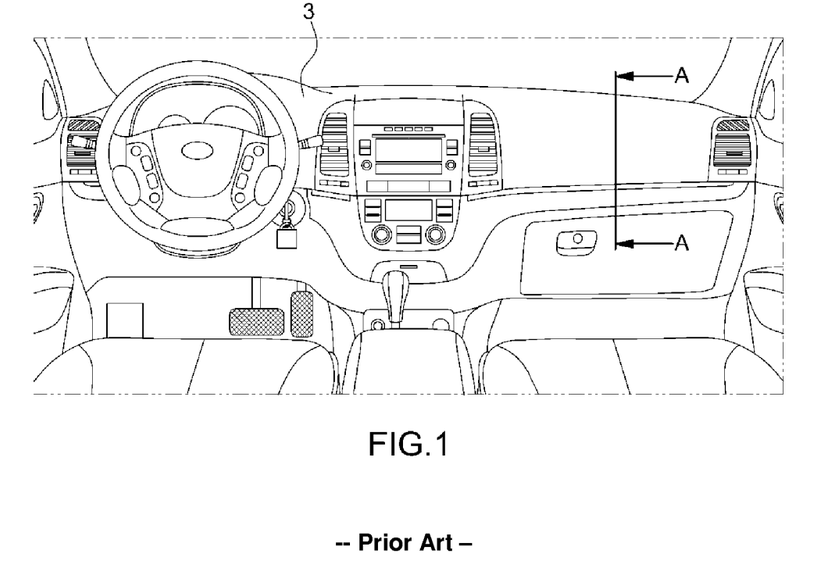
FIG. 1 is a view illustrating a conventional crash pad.
Figure 2:
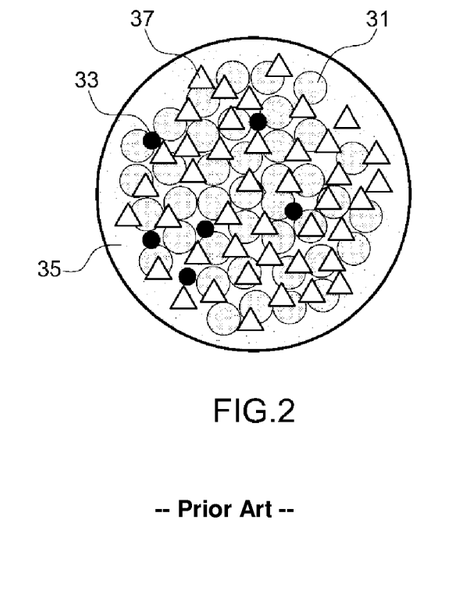
FIG. 2 is a view illustrating a skin of the conventional crash pad.
Figure 3:
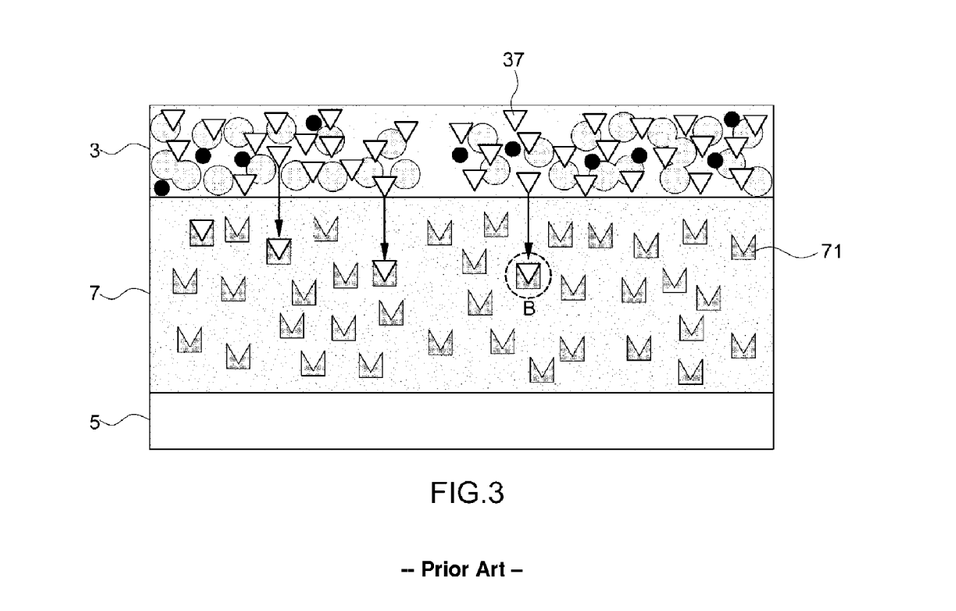
FIG. 3 is a view illustrating the cross section of the line AA of FIG. 1.

Referring to FIGS. 1 to 3, a conventional crash pad for a vehicle includes a skin 3 for providing an aesthetic surface, and a core 5 to support the crash pad at an inner side of the skin 3. A foaming layer 7 is interposed between the skin 3 and the core 5 and provides a cushion performance and shock absorption performance.

The skin 3 comprises a polyvinyl chloride (PVC) 31 of 50 to 60 weight %, a pigment (additive) 33 of 3 to 5 weight %, a drying agent 35 of 3 to 5 weight %, and a plasticizer 37 of 35 to 40 weight %. The plasticizer 37 improves soft texture, environment resisting property, and shock resisting property.

Referring to FIG. 3, the plasticizer 37 moves to the foaming layer 7 in a heat resisting aging (110° C., 300 hr) test process for confirming whether the crash pad satisfies the environment resisting property standard. Since the plasticizer 37 included in the skin 3 moves to the foaming layer 7 in the heat resisting aging process and is electrically combined with the foam molecular 71 of the foaming layer (see "B" in the foaming layer 7), the content of the plasticizer 37 of the skin 3 decreases.

Figure 4:
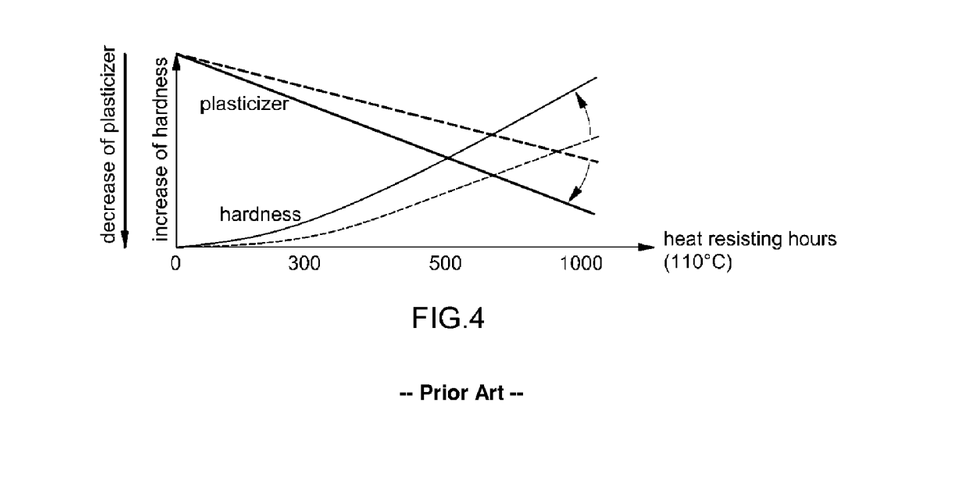
FIG. 4 is a view illustrating hardness of the crash pad according to the content of a plasticizer.
Figure 6:
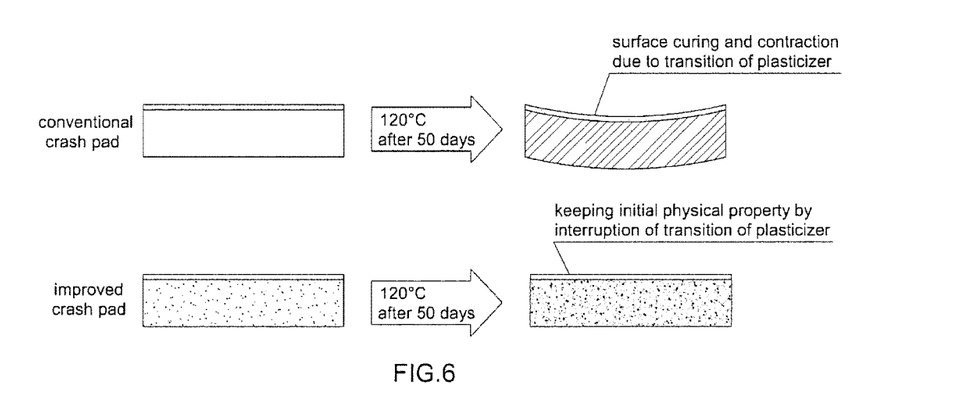
FIG. 6 is a view illustrating results of a heat resisting aging test of the conventional crash pad and the crash pad of the present disclosure.

Since the plasticizer 37 improves the soft texture and the environment resisting property of the skin as described above, as the plasticizer 37 decreases, hardness of the skin 3 increases and the skin 3 is cured as shown in FIG. 4, the skin 3 contracts and the airbag line and the like are exposed as shown in FIG. 6, and shock resisting property at a lower temperature is degraded.

Therefore, the development of a technology which prevents the transition of the plasticizer to solve the above problems of the skin is drastically required.

The above information disclosed in this Background section is only for enhancement of understanding of the background of the invention, and therefore, it may contain information that does not form the prior art that is already known in this country to a person of ordinary skill in the art.

SUMMARY OF THE DISCLOSURE

The present disclosure has been made in an effort to solve the above-described problems associated with the prior art.

An aspect of the present inventive concept provides a crash pad in which a plasticizer included in a skin does not move to a foaming layer.

Another aspect of the present inventive concept provides a crash pad which can prevent transition of a plasticizer at an airbag development line area which is directly related to safety.

The objects of the present inventive concept are not limited to the aspects described above, and other objects not mentioned will be obviously understood by those of ordinary skill in the art.

According to an embodiment of the present inventive concept, a crash pad includes a skin which includes a plasticizer and a forming space E. A foaming layer is foam formed by injecting a foam liquid to the forming space E. The foaming layer comprises a foam molecular formed by foam forming, and a coating agent surrounding the foam molecular and preventing transition of the plasticizer to the foaming layer.

The coating agent may have a polarity opposite to that of the plasticizer.

The coating agent may include a material same as the plasticizer.

The crash pad may further comprise an interrupting film interposed between the skin and the foaming layer and preventing the transition of the plasticizer.

The interrupting film may be thermoplastic olefin (TPO).

The interrupting film may comprise a plurality of through holes into which the foam molecular permeates, and the plurality of through holes have a diameter of 1.5 to 2.0 mm.

The interrupting film may comprise a separating line formed to coincide with an airbag development line of the skin and having a width of 10 to 20 mm from the separating line to an outer edge of the interrupting film.

The plurality of through holes are formed at 50 to 70 mm from the separating line.

The interrupting film may be attached to an inner side of the skin by a two-side tape.

The two-side tape may be a polyvinyl chloride (PVC) film.

The two-side tape may maintain 70 to 100% of an adhesive force even after 900 to 1000 hours at 100 to 110° C.

Other aspects and exemplary embodiments of the inventive concept are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present inventive concept, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents, and other embodiments, which may be included within the spirit and scope of the invention as defined by the appended claims.

Figure 5:
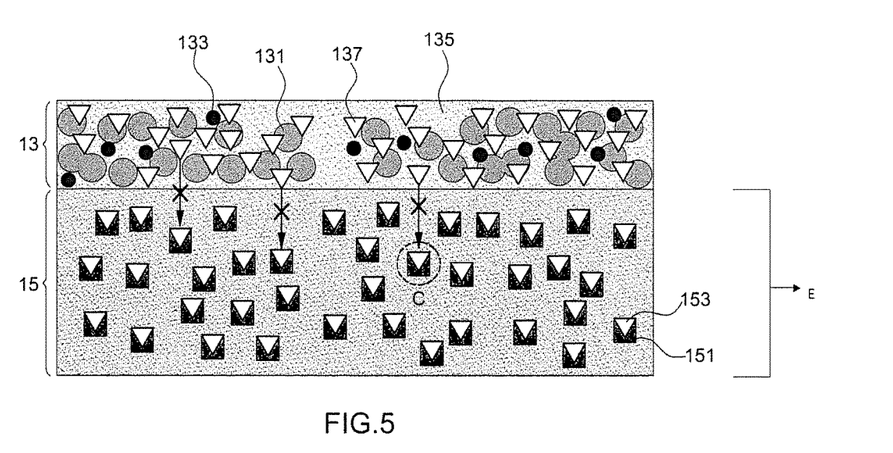
FIG. 5 is a view illustrating prevention of transition of a plasticizer of a crash pad according to the present disclosure

Referring to FIG. 5, a crash pad according to the present disclosure may comprise a core 5 (refer to the related art of FIG. 3), a skin 13 including a forming space in which a foaming layer 15 may be foam-formed by injecting a foam liquid into the forming space.

The crash pad may be manufactured by inserting the skin 13 and the core 5 into a mold (not shown), injecting the foam liquid into the forming space (not shown), and pressing the mold. Therefore, the core 5, the foaming layer 15, and the skin 13 may be stacked in the order from the bottom.

The core, which supports the crash pad, has the same structure and function as the core of the conventional crash pad, and thus, a detail description thereof will be omitted.

Referring to FIG. 5, the skin 13 may include polyvinyl chloride (PVC) 131, a pigment (additive) 133, a drying agent 135, and a plasticizer 137.

The plasticizer 137 improves softness feeling, environment resisting property, and shock resisting property of the skin 13, and may include a trimellitate-based or trioctyl trimellitate (TOTM)-based plasticizer. As described above, in the conventional crash pad, the plasticizer transits to the foaming layer during heat resisting aging, thus reducing the content of the plasticizer of the skin and degrading the physical property of the skin.

In the present disclosure, the foaming layer 15 is formed by foam-reacting polyurethane (herein below 'PU') which is a foaming liquid, and the PU liquid is formed as a foam molecular 151. Since the foam molecular 151 has many voids therein, the plasticizer 137 is electrically combined into the voids ("C" in FIG. 5) when moving to the foaming layer 15. In the exemplary embodiment of the present inventive concept, the foam molecular 151 is shown in the shape as shown in FIG. 5, however, the shape of the foam molecular 151 is not limited thereto.

In the crash pad according to the present disclosure, the foaming layer 15 may include a coating agent 153 which prevents the movement of the plasticizer 137.

The coating agent 153 is added to the PU liquid and may surround the foam molecular 151 when the foam molecular 151 is formed from the PU liquid.

Since the coating agent 153 surrounds the foam molecular 151, the electric combination "C" of the foam molecular 151 and the plasticizer 137 as described above may be interrupted.

If the coating agent 153 may prevent the combination of the foam molecular 151 and the plasticizer 137, any material may be used as the coating agent 153, or more specifically a material which has a polarity opposite to that of the plasticizer 137 may be used. Therefore, permeation of the plasticizer 137 into the foaming layer 15 may be difficult when the opposite polarities are not mixed.

In addition, by combining the coating agent 153 with the foam molecular 151 in advance by using the material same as the plasticizer, the transition of the plasticizer 137 may be prevented by blocking the plasticizer 137, which moves to the foaming layer 15 from the skin 13, from combining with the foam molecular 151.

Measurement Example

To confirm whether transition of the plasticizer is interrupted by the coating agent, the physical property of the crash pad is measured by adding the coating agent (the trimellitate-based plasticizer of the same material as the plasticizer is used) to the PU liquid and thereafter manufacturing the crash pad.

FIG. 6 is a view illustrating results of the heat resisting aging test of the conventional crash pad and the crash pad of the present disclosure, which is performed at 120° C. for 50 days (1200 hours).

In the conventional crash pad, surface curing and contraction of the skin due to the plasticizer transition were made, however, in the improved crash pad according to the present disclosure, since the initial physical property was maintained, it could be confirmed that the transition of the plasticizer was interrupted.

Figure 7A:
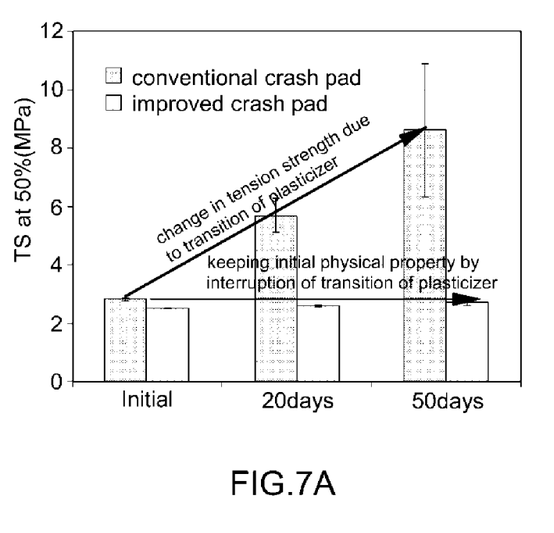
FIGS. 7A and 7B are views illustrating stress measurement upon tension and the content of the plasticizer during the heat resisting aging test of the conventional crash pad and the crash pad of the present disclosure.
Figure 7B:
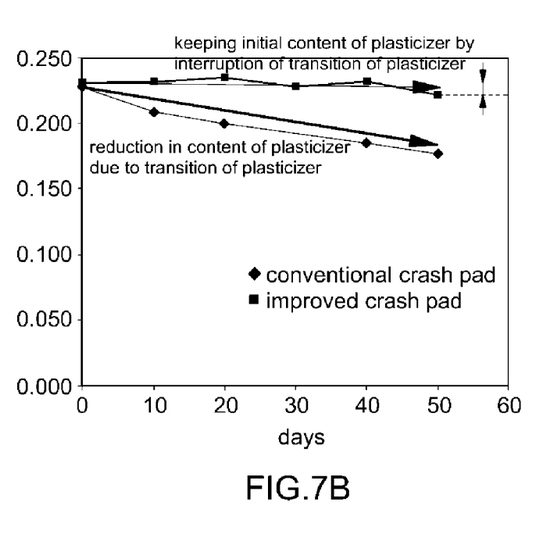

FIG. 7A is a graph showing measurement of stress upon tensioning the conventional crash pad and an improved crash pad according to the present disclosure in the process of heat resisting aging at 120° C. for 50 days (1200 hours), and FIG. 7B is a graph showing measurement of the content of the plasticizer in each specimen of the skin in a process of heat resisting aging.

Referring to FIG. 7A, in the conventional crash pad, the tension strength was significantly changed since the heat resisting aging was progressed and accordingly the plasticizer was transited. However, in the crash pad according to the present disclosure, since the initial physical property was maintained, it could be confirmed that the transition of the plasticizer was interrupted.

Referring to FIG. 7B, in the conventional crash pad, the heat resisting aging was progressed and accordingly the content of the plasticizer in the skin was continuously reduced. However, in the improved crash pad according to the present disclosure, since the content of the plasticizer of more than 90% compared to the initial content was maintained, it could be quantitatively confirmed that the plasticizer did not move.

The crash pad according to another embodiment of the present inventive concept may include an interrupting film 17 interposed between the skin and the foaming layer and preventing the transition of the plasticizer.

Figure 8:
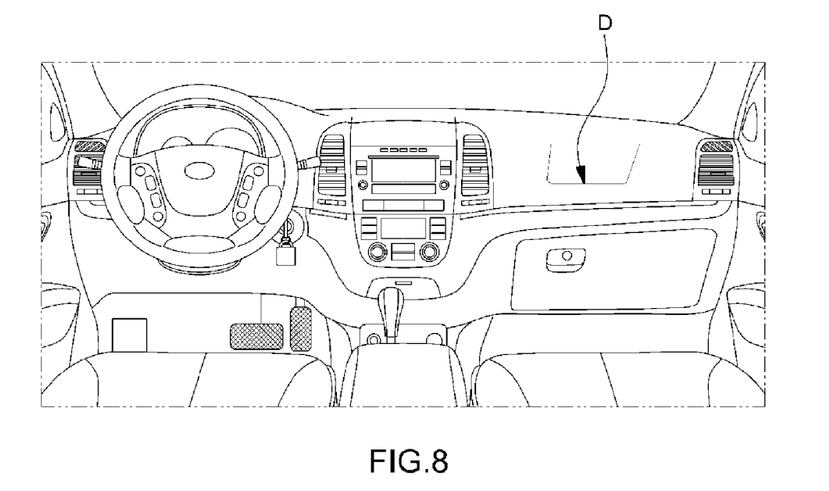
FIG. 8 is a view illustrating an airbag development line of a crash pad according to the present disclosure.

Referring to FIG. 8, since the crash pad for a vehicle has an airbag (not shown), the crash pad includes a kind of clearance referred to as an airbag development line D so that the airbag can be developed when the airbag should be operated upon the occurrence of accidents and the like.

In the conventional crash pad, since a contraction phenomenon of the skin due to the transition of the plasticizer may occur in an environment resisting condition (110° C., 1000 hours) and accordingly the transformation may occur on a surface of an airbag development line area, there is a safety problem.

Figure 9:
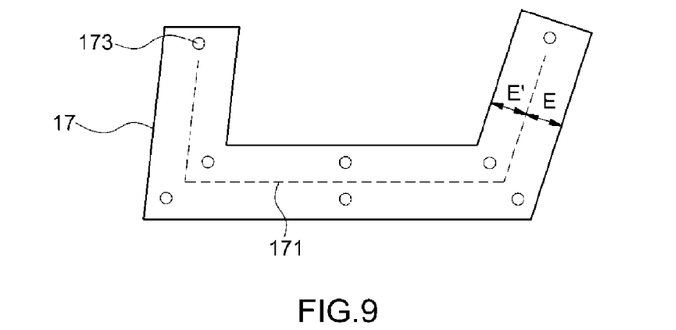
FIG. 9 is a view illustrating an isolating film of a crash pad according to the present disclosure.

Therefore, in the present disclosure, the interrupting film 17 is included for complete interruption of the plasticizer in the airbag development line area as shown in FIG. 9.

A thermoplastic olefin (TPO) material, which is superior in view of the environment resistance, may be used for the interrupting film 17.

Since the interrupting film 17 is interposed between the skin and the foaming layer, when taking into consideration both the adhesive force of the skin and the foaming layer and the efficiency of interruption of the transition of the plasticizer, the interrupting film may have thickness of 0.2 to 0.5 mm or more specifically 0.3 mm.

Referring to FIG. 9, the interrupting film 17 may include a separating line 171 which is cut to correspond to the airbag development line D. The interrupting film 17 may have a width E, E' of 10 to 20 mm on both sides of the separating line 171 with the separating line as a reference, or may have constant breadth E, E' on both sides of the separating line 171 as a center.

Figure 10:
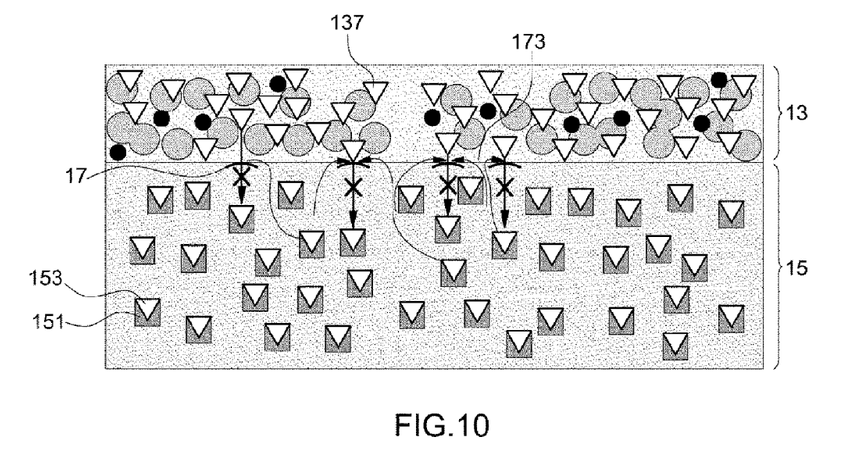
FIG. 10 is a view illustrating prevention of transition of a plasticizer of a crash pad according to the present disclosure.

Referring to FIGS. 9 and 10, the interrupting film 17 may include a number of through holes 173 so that the foam molecular 151 may permeate. As described above, when injecting the foam liquid into the forming space E and thereafter pressing the skin and the core with the mold, the foaming layer and the skin adhere. However, since the interrupting film 17 is interposed between the foaming layer and the skin, the adhesive force of the foaming layer and the skin may decrease.

Therefore, according to the present disclosure, the transition of the plasticizer 137 is prevented, and at the same time, the decrease of the adhesive force of the skin and the foaming layer is prevented by forming the through holes 173 on the interrupting film 17, into which the foam molecular 151 may permeate.

The through holes 173 may be formed in any form and at any position on the interrupting film 17. As one example, the through holes 173 may have diameter of 1.5 to 2.0 mm and at positions 50 to 70 mm from the separating line 171 for uniform adhering of the skin and the foaming layer to increase the adhering force.

Referring to FIG. 10, the crash pad according to the present disclosure includes the interrupting film 17 so as to interrupt the transition of the plasticizer in a physical method, and at the same time, since the coating agent 153 which has the polarity opposite to that of the plasticizer 137 surrounds the foam molecular 151 so as to make difficult the permeation of the plasticizer 137 and the combination of the plasticizer 137 to the foam molecular 151, the transition of 98% or more of the plasticizer 137 may be interrupted.

Figure 11:
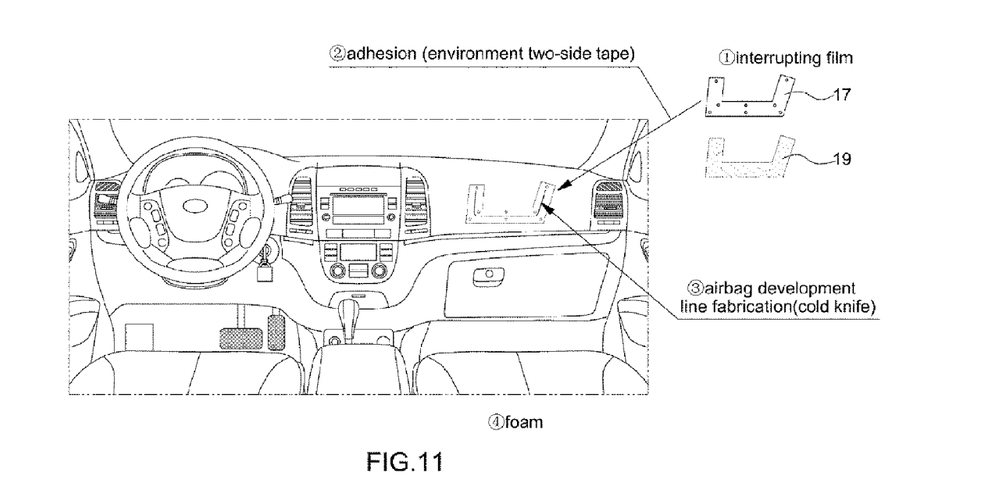
FIG. 11 is a view illustrating a process of adhering an isolating film to a skin of a crash pad according to the present disclosure.

Referring to FIG. 11, the crash pad according to the present disclosure may be manufactured by adhering the interrupting film 17 to an inner of the skin, fabricating the airbag development line, and forming the foaming layer by injecting the foam liquid including the coating agent into the forming space E as described above.

Therefore, an environment resisting two-side tape 19 may be attached to one side of the interrupting film 17 so as to adhere the interrupting film to the skin.

The two-side tape 19 is attached to a precise position of the skin even after the heat resisting aging process (at 120° C. for 50 days) because when the position of the interrupting film is adversely changed due to the reduction of the adhesive force, there may be safety problem due to the inconsistence between the airbag development line and the separating line even the combining force of the skin and the foaming layer may be reduced due to the deviation of the interrupting film.

Therefore, the two-side tape may be a PVC film which satisfies the condition where 70% or more of the adhesive force is maintained even after 1000 hours at 110° C.

In the crash pad according to the present disclosure, a foaming layer may include a coating agent which has polarity opposite to that of the plasticizer or include the coating agent of the same material as the plasticizer, so as to prevent permeation of the plasticizer and combination of the plasticizer to a foam molecular.

Furthermore, in the crash pad according to the present disclosure, an interrupting film which is interposed between a skin and the foaming layer is included so as to interrupt transition of the plasticizer.

Therefore, the crash pad according to the present disclosure has an effect of solving the problems of the curing of the skin, exposure of the airbag development line, and degradation of cold shock resisting property, by interrupting 98% or more of the transition of the plasticizer.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A crash pad comprising:
   a skin having a plasticizer;
   a foaming layer stacked onto the skin; and
   an interrupting film interposed between the skin and the foaming layer and preventing transition of the plasticizer,
   wherein the foaming layer comprises:
      a foam molecular formed by foam forming; and
      a coating agent surrounding the foam molecular and preventing transition of the plasticizer to the foaming layer, and
   wherein the interrupting film comprises a plurality of through-holes into which the foam molecular permeates.

2. The crash pad of claim 1, wherein the coating agent has a polarity opposite to that of the plasticizer.

3. The crash pad of claim 1, wherein the coating agent includes a material same as the plasticizer.

4. The crash pad of claim 1, wherein the interrupting film is thermoplastic olefin (TPO).

5. The crash pad of claim 1, wherein the plurality of through-holes have a diameter of 1.5 to 2.0 mm.

6. The crash pad of claim 1, wherein the interrupting film comprises a separating line aligned with an airbag development line of the skin.

7. The crash pad of claim 6, wherein the interrupting film has a width of 10 to 20 mm from the separating line to an outer edge of the interrupting film.

8. The crash pad of claim 7, wherein the plurality of through-holes are formed at 50 to 70 mm from the separating line.

9. The crash pad of claim 1, wherein the interrupting film is attached to an inner side of the skin by a two-side tape.

10. The crash pad of claim 9, wherein the two-side tape is a polyvinyl chloride (PVC) film.

11. The crash pad of claim 10, wherein the two-side tape maintains 70 to 100% of an adhesive force even after 900 to 1000 hours at 100 to 110° C.

12. The crash pad of claim 1, wherein the skin further includes PVC, a pigment, and a drying agent.

13. The crash pad of claim 1, wherein the plasticizer is a trimellitate-based or trioctyl trimellitate (TOTM)-based plasticizer.

* * * * *